US006923915B2

(12) United States Patent
Alford et al.

(10) Patent No.: US 6,923,915 B2
(45) Date of Patent: Aug. 2, 2005

(54) PROCESS FOR THE REMOVAL OF IMPURITIES FROM COMBUSTION FULLERENES

(75) Inventors: J. Michael Alford, Lakewood, CO (US); Robert Bolskar, Boulder, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 57 days.

(21) Appl. No.: 10/233,010

(22) Filed: Aug. 30, 2002

(65) Prior Publication Data

US 2003/0044341 A1 Mar. 6, 2003

Related U.S. Application Data

(60) Provisional application No. 60/316,315, filed on Aug. 30, 2001.

(51) Int. Cl.[7] .......................... B01D 11/04; C01B 31/02
(52) U.S. Cl. .................. 210/634; 423/461; 423/445 B; 977/DIG. 1
(58) Field of Search ................................ 210/634, 639, 210/774, 806; 423/445 R, 460, 461, 445 B; 977/DIG. 1

(56) References Cited

U.S. PATENT DOCUMENTS

| | | | | |
|---|---|---|---|---|
| 4,952,749 A | * | 8/1990 | Alexander et al. | .......... 585/803 |
| 4,964,995 A | * | 10/1990 | Chum et al. | ................. 210/634 |
| 5,227,038 A | | 7/1993 | Smalley et al. | |
| 5,273,729 A | | 12/1993 | Howard et al. | |
| 5,304,366 A | | 4/1994 | Lorents et al. | |
| 5,316,636 A | | 5/1994 | Bunshah et al. | |
| 5,648,056 A | | 7/1997 | Tanaka | |
| 5,876,684 A | | 3/1999 | Withers et al. | |
| 5,985,232 A | | 11/1999 | Howard et al. | |
| 6,001,256 A | * | 12/1999 | Hawthorne et al. | .......... 210/643 |
| 6,083,469 A | * | 7/2000 | Leftin | ..................... 423/445 B |
| 6,162,411 A | | 12/2000 | Howard et al. | |
| 6,593,166 B1 | * | 7/2003 | Silverbrook | .................. 438/99 |
| 6,806,397 B1 | * | 10/2004 | Reilly | ......................... 585/446 |
| 2001/0010809 A1 | * | 8/2001 | Haldon et al. | |

OTHER PUBLICATIONS

Bachmann et al. (1994), "The formation of $C_{60}$ and its precursors in naphthalene flames," Chem. Phys. Lett. 223:506–510.

Bogdanov, A.A. et al. (May 2000), "Development Prospects of the Commercial Production of Fullerenes," Tech. Phys. 45(5):521–527.

(Continued)

*Primary Examiner*—Joseph Drodge
(74) *Attorney, Agent, or Firm*—Greenlee, Winner and Sullivan, P.C.

(57) ABSTRACT

The invention generally relates to purification of carbon nanomaterials, particularly fullerenes, by removal of PAHs and other hydrocarbon impurities. The inventive process involves extracting a sample containing carbon nanomaterials with a solvent in which the PAHs are substantially soluble but in which the carbon nanomaterials are not substantially soluble. The sample can be repeatedly or continuously extracted with one or more solvents to remove a greater amount of impurities. Preferred solvents include ethanol, diethyl ether, and acetone. The invention also provides a process for efficiently separating solvent extractable fullerenes from samples containing fullerenes and PAHs wherein the sample is extracted with a solvent in which both fullerenes and PAHs are substantially soluble and the sample extract then undergoes selective extraction to remove PAHs. Suitable solvents in which both fullerenes and PAHs are soluble include o-xylene, toluene, and o-dichlorobenzene. The purification process is capable of treating quantities of combustion soot in excess of one kilogram and can produce fullerenes or fullerenic soot of suitable purity for many applications.

44 Claims, 5 Drawing Sheets

OTHER PUBLICATIONS

Chattopadhyay, P. and Gupta, R.B. (May 2000), "Supercritical $CO_2$–Based Production of Fullerene Nanoparticles," Ind. Eng. Chem. Res. 39:2281–2289.

Curl et al. (Oct. 1991), "Fullerenes," Sci. Am. pp. 54–63.

Datars, W.R. et al. (1995), "An efficient fulleride production system," Can. J. Phys. 73:38–44.

Diederich et al. (1991), "The Higher Fullerenes: Isolation and Characterization of $C_{76}$, $C_{84}$, $C_{90}$, $C_{94}$, and $C_{70}O$, an Oxide of $D_{5h}$–$C_{70}$," Science 252:548–551.

Diener, M.D. et al. (Sept. 2000—web published), "Synthesis of Single–Walled Carbon Nanotubes in Flames," J. Phys. Chem. B 104:9615–9620.

Gordon, A. and Ford, R. (1972), *The Chemists Companion*, John Wiley and Sons, New York, pp. 24–30.

Hebgen, P. and Howard, J.B. (1999), "Synthesis of Fullerenes in Low Pressure Benzene/Oxygen Diffusion Flames," Fifth Int'l Microgravity Combustion Workshop, K.R. Sachsteder and J.S. Tien (eds.) NASA/CP 1999–208917, pp. 137–140.

Homann, K.–H. (1998), "Fullerenes and Soot Formation—New Pathways to Large Particles in Flames," Angew, Chem. Int. Ed. 37:2434–2451.

Howard et al. (1991), "Fullerenes $C_{60}$ and $C_{70}$ in flames," Nature 352:139–141.

Howard et al. (1992), "Production of $C_{60}$ and $C_{70}$ Fullerenes in Benzene–Oxygen Flames," J. Phys. Chem. 96:6657–6662.

Howard et al. (1992), "Fullerenes Synthesis in Combustion," Carbon 30:1183–1201.

Krätschmer et al. (1990), "Solid $C_{60}$: a new form of carbon," Nature 347:354–358.

Kroschwitz, J., exec. ed. (1997) Kirk–Othmer Encyclopedia of Chemical Technology, fourth edition, vol. 23, John Wiley and Sons, New York, pp. 452–477.

Kroto, H.W. et al. (1992), "Separation and Spectroscopy of Fullerenes," $12^{th}$ General Conf. of the Condensed Matter, Division of the European Physical Society, vol. T45, pp. 314–318.

Marcus et al. (Mar. 2001), "Solubility of $C_{60}$ Fullerene," J. Phys. Chem. B 105:2499.

McKinnon et al. (1992), "Combustion Synthesis of Fullerenes," Comb. Flame 88:102–112.

Ruoff et al. (1993), "Solubility of $C_{60}$ in a Variety of Solvents," J. Phys. Chem. 97:3379–3383.

Shinohara, H. et al. (1991), "Formation and Extraction of Very Large All–Carbon Fullerenes," J. Phys. Chem. 95(220:8449–8451.

Taylor et al. (1993), "Formation of $C_{60}$ by pyrolysis of naphthalene," Nature 366:728–731.

Zakharov et al. (Mar. 2000) "Electronic Absorption Spectra Determination of $C_{60}$ content in Soot Produced in Hydrocarbon Flames," J. Appl. Spectrosc. 67:349.

Zhang et al. (1999), "Laser Ablation Mass Spectrometry of Pyrolyzed Koppers Coal–Tar Pitch: A Precursor for Fullerenes and Metallofullerenes," J. Phys. Chem. B 103:9450–9458.

Krätschmer, W. and Huffman, D.R. (1993), "Fullerites: New Forms of Crystalline Carbon," in *The Fullerenes*, Kroto, H.W. et al. (eds.), Pergamon Press, Oxford:New York, pp. 5–9.

Lamb, L.D. and Huffman, D.R. (1993), "Fullerene Production," J. Phys. Chem. Solids 54(12):1635–1643.

Théobald, J. and Perrut, M. (1995), "Extraction and Purification of Fullerenes: A Comprehensive Review," Sep. Sci. Technol. 30(14):2783–2819.

* cited by examiner

PROCESS FOR THE REMOVAL OF IMPURITIES FROM COMBUSTION FULLERENES

CROSS-REFERENCE TO RELATED APPLICATIONS

This application takes priority from U.S. Provisional Patent Application No. 60/316,315 filed Aug. 30, 2001, which is incorporated by reference herein to the extent not inconsistent with the disclosure within.

STATEMENT REGARDING FEDERALLY SPONSORED RESEARCH OR DEVELOPMENT

The invention was made with funding from the United States government through the U.S. Department of Energy PETC under contract DE-FG03-98ER82692. The United States government has certain rights in this invention.

TECHNICAL FIELD OF THE INVENTION

The invention relates to the purification of carbon nanomaterials. In particular, the invention relates to a process for removal of polycyclic aromatic hydrocarbons (PAHs) and other hydrocarbon impurities from fullerenes and other carbon nanomaterials, especially carbon nanomaterials produced by the combustion process.

BACKGROUND OF THE INVENTION

Fullerenes are a recently discovered class of multi-atomic closed cage carbon clusters with the truncated icosahedron $C_{60}$, buckminsterfullerene, being the most abundant. Several methods of synthesizing fullerenes are known. The electric-arc method is a common method of making fullerenes. However, current electric-arc methods are not typically suitable for commercial-scale production of fullerenes due to high cost and low production rates. A more commercially promising method of making fullerenes is the combustion method.

The combustion method for fullerene production is a continuous, scalable process that employs inexpensive hydrocarbon fuels, including among others aromatic and/or aliphatic hydrocarbons. As such, it is the most economical known route for large-scale commercial production of fullerenes. Fullerenes and fullerenic soot have potential applications as additives to electron and photo-resists for semiconductor processing; for use in proton-conducting membranes for fuel cells, optical limiting materials and devices, and lithium battery anodes; as active elements in organic transistors; as pigments in cosmetics; as antioxidants; and as therapeutics, e.g., as anti-viral agents. Many of these applications are sensitive to impurities such as PAHs. In some applications, particularly in pharmaceuticals and cosmetics, PAHs must be removed because of their known carcinogenicity. In other applications, small amounts may be tolerable without affecting the application, but would not be acceptable for marketing and/or liability concerns. In either case, the PAHs and other hydrocarbon contaminants are a hindrance to acceptance of the combustion process for fullerene synthesis and could potentially offset its favorable cost advantage.

Carbon nanomaterials, a broader class of potentially useful materials which includes soluble and insoluble fullerenes, as well as single-walled carbon nanotubes (SWNTs), multiple-walled carbon nanotubes (MWNTs), nanotubules, and nested carbon structures with dimensions on the order of nanometers, can also be produced in soot from combustion methods and can be contaminated with undesirable impurities including various PAHs. Combustion soot containing carbon nanomaterials, fullerenes or both is useful in various applications.

The types and amounts of PAHs produced during carbon nanomaterial synthesis can depend upon the fuel used and the combustion conditions. The electric-arc process typically generates fewer PAH and hydrocarbon impurities than combustion processes. Thus, the ability to efficiently remove PAHs and other hydrocarbon contaminants from carbon nanomaterial containing combustion products is important for keeping the combustion production process competitive with the arc process.

Solvent washing has been used for cleaning fullerenes produced in the electric-arc process. The first mention of this method is in the original report of bulk $C_{60}$ production by Kratschmer et al. (1990), "Solid $C_{60}$: a New Form of Carbon," Nature 347:354. Ether was used to remove "ubiquitous hydrocarbons" from the soot prior to either dispersing the soot in benzene to form a solution containing $C_{60}$ or heating the soot to sublime the $C_{60}$. The "ubiquitous hydrocarbons" were, however, not specifically identified. Since the electric-arc process produces very little, if any, PAH impurities, it is unlikely that these "ubiquitous hydrocarbons" contained substantial quantities of PAHs.

The ability to wash various non-aromatic impurities from combustion synthesized fullerenes using diethyl ether was noted by McKinnon (McKinnon et al. 1992, "Combustion Synthesis of Fullerenes," Combustion and Flame 88:102). McKinnon et al. treated their combustion soot with toluene, then treated the soot extract with diethyl ether. McKinnon et al. expected to find oxygenated PAH impurities in the soot toluene extract, but no aromatic impurities were identified. Infrared (IR) analysis of the toluene raw extract indicated the presence of a "carbonyl material" impurity which was not aromatic. The "carbonyl material" appeared by IR to be largely removed from the fullerene material by a diethyl ether wash. The carbonyl material was not further identified.

A paper by Zakharov et al. (2000) "Electronic Absorption Spectra Determination of $C_{60}$ Content in Soot Produced in Hydrocarbon Flames," J. Appl. Spectrosc. 67:349, reports experiments in using electronic absorption spectroscopy to measure the content of fullerenes. The authors report methods for lowering the content of unidentified hydrocarbon compounds in combustion soot which may interfere with and decrease the accuracy of the determination of fullerene content by electronic absorption spectroscopy. The authors generated soot employing a method that was expected to generate fullerene-containing soot. However, the soot generated was shown by mass spectral analysis not to contain fullerenes (see page 351, first full paragraph, lines 6–7). Thermal treatment or ether treatment of this soot was reported to remove hydrocarbon impurities and reduce the electronic absorptions that would be expected to interfere with measurement of electronic absorptions characteristic of fullerenes. Thermal treatment involving heating the soot sample at temperatures of 374 K, 498 K, or 593 K was reported to be more effective then ether treatment for decreasing the potentially interfering absorptions. Ether treatment involved pouring a 20 mg soot sample into 20 ml of ether, leaving the soot sample in contact with the ether for 30 to 120 minutes, then decanting the ether. In some cases the ether treatment procedure was repeated. The methods described, however, were not demonstrated to selectively remove undesired impurities from fullerene-containing soot, because the soot employed in the experiments reported did not contain fullerenes.

The Inventors of the instant-invention have discovered an extraction process specifically suitable for cleaning PAHs and other hydrocarbon impurities from combustion-produced carbon nanomaterials, including fullerenes and fullerenic soot. With this discovery, a new process for purifying carbon nanomaterials from combustion soot can be economically run on kilogram quantities of combustion soot.

SUMMARY OF THE INVENTION

The invention generally relates to purification of carbon nanomaterials, including fullerenes and fullerenic soot, by removal of PAHs and other hydrocarbon impurities. The method can also be applied to the removal of PAHs and other hydrocarbon impurities from combustion soot which contains carbon nanomaterials, fullerenes or both. The process allows efficient removal of non-carbon nanomaterial contaminants, such as PAHs, and undesirable partially oxidized hydrocarbons without incurring undo cost. The removal process is capable of treating quantities of combustion soot in excess of one kilogram and is scalable to even larger volumes. Furthermore, the removal process produces carbon nanomaterials, particularly fullerenes or fullerenic soot, of suitable purity for many applications. In some cases, the resulting fullerene purity is as high or higher than that of commercially available arc produced fullerenes.

The inventive process for removing PAHs from a sample containing carbon nanomaterials and PAHs involves extracting (or washing) the sample with a solvent in which the PAHs are substantially soluble but in which the carbon nanomaterials, particularly fullerenes, are not substantially soluble. Solvents appropriate for use in the purification method of this invention include alcohols, including diols and glycols, ethers, aldehydes, ketones, alkanes, substituted alkanes, e.g., haloalkanes, nitroalkanes and alkyl nitriles, and supercritical fluids. Samples containing carbon nanomaterials include combustion soot and dried fullerene-containing extract from combustion soot. Certain soluble fullerenes can be extracted from combustion soot, for example, using aromatic hydrocarbon solvents, such as single ring aromatics, e.g., benzene, toluene, xylene, or mixtures thereof.

The sample containing carbon nanomaterials can be repeatedly or continuously extracted with one or more solvents or mixtures of solvents to remove a greater amount of impurities. Preferred solvents include ethanol, diethyl ether, acetone or mixtures or azeotropes thereof. Selective sequential extraction with multiple solvents can be employed, with different solvents being selected for removal of different impurities. For example, the process can be started with ethanol to remove the lighter PAHs and followed with extraction with diethyl ether to remove heavier PAHs. Sequential extraction with multiple solvents can reduce the amount of carbon nanomaterials, particularly soluble fullerenes, removed during the extraction process by limiting the exposure of the sample to solvents having a higher solubility for fullerenes or other carbon nanomaterials. When the extraction to remove impurities is completed, the extracted carbon nanomaterials can be further purified by drying in vacuum at a temperature where PAHs, but not carbon nanomaterials, sublime. The temperature range for vacuum drying ranges generally from room temperature to about 400° C. Reduced pressure of 1 torr or less is preferably employed for vacuum drying. Alternatively, vacuum drying may be performed at other stages of the process. Typically, the process for removing PAHs from a sample containing carbon nanomaterials will also remove other undesired hydrocarbon impurities.

In one embodiment, the invention provides a process for the removal of polycyclic aromatic hydrocarbons (PAHs) from a sample containing carbon nanomaterials and PAHs comprising the steps of:

(a) providing a sample containing carbon nanomaterials and PAHs and a solvent in which the carbon nanomaterials are not substantially soluble and in which the PAHs are substantially soluble; and (b) continuously or multiply extracting the sample with the solvent.

More specifically, the invention also provides a process for efficiently separating solvent extractable fullerenes from samples containing fullerenes and PAHs such as combustion soot. In the process, the sample is extracted with a first solvent in which both fullerenes and PAHs are substantially soluble and the sample extract, typically after removal of the first solvent, then undergoes selective extraction with a second solvent to remove PAHs. Suitable solvents in which both fullerenes and PAHs are soluble include single ring aromatic hydrocarbons, particularly o-xylene, toluene, and o-dichlorobenzene. Reduction of the amount of material undergoing selective PAH extraction can result in increased process efficiency.

The separation process of the invention can be used in any process that generates carbon nanomaterials, is particularly useful for purification of carbon nanomaterials produced by combustion processes and is especially useful when the combustion soot is produced from hydrocarbon fuels which comprise one or more aromatic fuels which are molecules that contain two or more rings, one or more of which is an aromatic ring, including, among others, PAHs. Combustion products of aromatic fuels for which the present methods are useful include those products generated by combustion of aromatic fuels having two or more rings, only one of which is aromatic, and those having two or more aromatic rings in combination with one or more rings that are not aromatic.

In one embodiment, the separation process comprises the steps of:

(a) extracting the sample containing fullerenes and PAHs with a first solvent in which fullerenes and PAHs are substantially soluble, thereby creating a first sample extract containing fullerenes and PAHs; and (b) extracting the first sample extract with a second solvent in which the PAHs are substantially soluble but in which the fullerenes are not substantially soluble, thereby creating a second sample extract having enhanced fullerene purity relative to the sample.

In this embodiment, the first solvent is typically removed from the first extract prior to extraction with the second solvent.

BRIEF DESCRIPTION OF THE DRAWINGS

FIGS. 3A and 3B illustrate the effectiveness of an exemplary extraction procedure of this invention.

DETAILED DESCRIPTION OF THE INVENTION

The process of the invention for removing PAHs from a sample containing carbon nanomaterials and PAHs involves extracting a sample containing carbon nanomaterials with a solvent in which the PAHs are substantially soluble but in which the carbon nanomaterials are not substantially soluble. Typically, the process for removing PAHs from a sample containing carbon nanomaterials will also remove other hydrocarbon impurities.

In one embodiment, the invention provides a process for the removal of polycyclic aromatic hydrocarbons (PAHs) from a sample containing carbon nanomaterials and PAHs comprising the steps of:
 (a) providing a sample containing carbon nanomaterials and PAHs and a solvent in which the carbon nanomaterials are not substantially soluble and in which the PAHs are substantially soluble; and
 (b) continuously or multiply extracting the sample with the solvent.

The term "carbon nanomaterials" is used generally herein to refer to any substantially carbon material containing six-membered rings that exhibits curving of the graphite planes, generally by including five-membered rings amongst the hexagons formed by the positions of the carbon atoms, and has at least one dimension on the order of nanometers. Examples of carbon nanomaterials include, but are not limited to, (soluble and insoluble) fullerenes, single-walled carbon nanotubes (SWNTs), multiple-walled carbon nanotubes (MWNTs), nanotubules, and nested carbon structures with dimensions on the order of nanometers. Carbon nanomaterials may be produced in soot and, in certain cases, carbon nanomaterials may be isolated from the soot or enriched in the soot. Soot produced during the synthesis of carbon nanomaterials, such as fullerenes, typically contains a mixture of carbon nanomaterials which is a source for further purification or enrichment of carbon nanomaterials or which may itself exhibit desired properties of carbon nanomaterials and be useful as an addition to convey those properties. The term "carbon nanomaterials," when used without limitation, is intended to include soot containing detectable amounts of carbon nanomaterials. For example, the term fullerenic soot is used in the art to refer to soot containing fullerenes. Fullerenic soot is encompassed by the term carbon nanomaterials.

The term "fullerene" is used generally herein to refer to any closed cage carbon compound containing both six- and five-member carbon rings independent of size and is intended to include the abundant lower molecular weight $C_{60}$ and $C_{70}$ fullerenes, smaller molecular weight fullerenes, including $C_{20}$, $C_{24}$, $C_{26}$, etc. up to $C_{60}$, and higher molecular weight fullerenes $C_{2N}$ where N is 36 or more, including $C_{76}$, $C_{78}$, and $C_{84}$. The term is intended to include "solvent extractable fullerenes" as that term is understood in the art (generally including the lower molecular weight fullerenes that are soluble in toluene or xylene) and to include higher molecular weight fullerenes that cannot be extracted, including giant fullerenes which can be at least as large as $C_{400}$.

As used herein the term "polycyclic aromatic hydrocarbon" or "PAH" refers generally to aromatic hydrocarbon molecules containing two or more six-membered rings, two or more five-membered rings or a mixture of one or more five- and one or more six-membered rings. For example, PAHs can have one aromatic six-member ring and a saturated or unsaturated six-member or five-member ring (e.g., indene and indane); two aromatic rings (e.g., naphthalenes); and three aromatic rings (e.g., anthracene and phenanthrene). The term "PAH" excludes fullerenes and other carbon nanomaterials. Typically PAHs are components of combustion soot produced by the combustion of hydrocarbon fuels during the production of fullerenes. The term "PAH" is intended to encompass all such molecules produced during the formation of combustion soot and is not intended to be limited to specific members of the general class of molecules.

Samples containing carbon nanomaterials, including fullerenes, and PAHs can be obtained in general from any synthetic method that produces carbon nanomaterials, including plasma synthesis, laser synthesis (e.g., laser ablation methods), pyrolysis, combustion or arc methods. The presence and amount of PAHs in a given sample will depend upon the synthetic method employed and the type of starting material or fuel employed. The methods of this invention are particularly useful in the purification of combustion soot, or dried extracts of combustion soot. As used herein the term "combustion soot" generally refers to a material comprised of the products collected from the burning of hydrocarbon carbon fuels. Combustion soot may contain carbon nanomaterials generally, fullerenes specifically, PAHs, other hydrocarbons, and other impurities. The separation process of the invention is especially useful when the combustion soot is produced from hydrocarbon fuels which comprise one or more aromatic fuels that contain two or more rings, one or more of which is an aromatic ring, including those fuels having two or more rings, only one of which is aromatic, and those having two or more aromatic rings in combination with one or more rings that are not aromatic. The hydrocarbon fuels used in combustion processes for which the present methods are particularly useful may comprise a substantial amount (i.e., about 30% or more by weight) of one or more aromatic molecules having two or more six-member rings, two or more five-member rings or a mixture of one or more six-member rings and one or more five-member rings.

As used herein the term "substantially soluble" refers to the solubility of a material in a solvent and particularly to materials that are soluble in a specific solvent, solvent mixture, or class of solvents. Conversely, the term "not substantially soluble" refers to a situation where a particular material does not dissolve in a solvent or sparingly dissolves, such that further processing steps are feasible and recovery yields are acceptable.

The inventive process relies on differences in solubility between members of the PAH family, such as anthracene and pyrene, and the carbon nanomaterials of interest. Organic solvents useful for performing selective extraction of PAHs from carbon nanomaterials include small alkanes (e.g., typically those having 8 carbon atoms or less), straight chain or cyclic ethers, straight chain or cyclic ketones, alcohols, and their mixtures and azeotropes. The solvent is selected to be liquid at the temperature at which the extraction is to be conducted. Lower molecular weight solvents generally have higher solubility for PAHs relative to their solubility for the carbon nanomaterial of interest. Small alkanes and small substituted alkanes useful for the present invention include straight-chain, branched and cyclic alkanes having 8 or fewer carbons, e.g., propane, butane, pentane, hexane, heptane, and octane, and derivatives thereof substituted with one or more ether groups, one or more alcohol groups, one or more ketone groups, one or more aldehyde groups, one or more halide groups, one or more nitro groups or one or more nitrile groups, e.g., fluoroethane, fluorochloroethane, various freons, nitroethane, acetonitrile, etc. Alcohols useful in the present method include straight-chain, branched and cyclic alcohols and diols having less than 8 carbon atoms, e.g., methanol, ethanol, propanol, etc. Ketones and aldehydes useful in the present method include straight-chain, branched and cyclic ketones having fewer than 8 carbons, e.g., acetone, acetaldehdye, etc. Solvents useful in the invention also include alcohols, ketones and aldehydes substituted with one or more halide groups, one or more nitro groups or one or more nitrile groups, e.g., chlorethanol. Solvents useful in the invention also include alkanes, substituted alkanes, ketones, aldheydes and alcohols having 5 or fewer carbons and alkanes, substituted alkanes, ketones, aldheydes and alcohols having 4 or fewer carbons. Mixtures of two or more solvents can be employed in the extractions of this invention. For example, mixtures of alkanes, substituted alkanes, ketones, substituted ketones, aldheydes, substituted aldehydes, alcohols, and substituted alcohols can be employed. Further, mixtures of less polar solvents, e.g., alkanes, with more polar solvents (e.g., alcohols, ketones, aldehdyes or substituted alkanes) can be employed. Specific mixtures that can be used include, among others, ethanol and acetone, hexane and ethanol, hexane and acetone, etc.

Continuous extraction methods can be employed in this invention employing a single solvent or a solvent mixture. A solvent mixture can be employed in continuous extraction methods in which the extraction solvent is continuously distilled through use of azeotropes (including binary and ternary azeotropes). Azeotropes are mixtures of components that boil together at a selected temperature. Exemplary binary and ternary azeotropes are listed in Table II of Gordon and Ford (Gordon, A. and Ford, R., "The Chemists Companion", (1972), John Wiley and Sons, New York, pp.24–30).

Supercritical or near supercritical fluids can also be employed in the methods of this invention. As used herein, a "supercritical or near supercritical fluid" means a substance that is above its critical pressure and temperature or is substantially near its critical pressure and temperature. By substantially near, it is meant that the pressure or temperature is within the range of 0.9 to 1.5 times the critical pressure or temperature. Of particular interest is supercritical or near supercritical $CO_2$. Methods for generating and using supercritical or near supercritical fluids are known in the art. Supercritical fluids known for use in supercritical fluid extraction include carbon dioxide, ammonia, water, methanol, ethanol, propyl alcohol, $C_1$–$C_6$ alkanes, and ethylene (Kroschwitz, J. exec. ed., Kirk-Othmer Encyclopedia of Chemical Technology (1997), pages 452–477, volume 23, fourth edition, John Wiley and Sons, New York).

The solubility of fullerenes (as $C_{60}$) in a number of solvents has been investigated (Ruoff et al. (1993), "Solubility of $C_{60}$ in a Variety of Solvents," J. Phys. Chem. 97:3379; Marcus et al. (2001), "Solubility of $C_{60}$ Fullerene," J. Phys. Chem. B 105:2499). Fullerenes exhibit the highest solubility in aromatic solvents such as benzene, xylene, and o-dichlorobenzene, and have little or no solubility in short chain aliphatic alcohols, ethers, aldehydes, ketones, or aliphatic hydrocarbons. PAHs also exhibit good solubility in aromatic solvents, but unlike carbon nanomaterials, they also have substantial solubility in alcohols, ethers, aldehydes, ketones, and aliphatic solvents. The physical properties of some PAHs can be found in the CRC Handbook of Chemistry and Physics (1992) $73^{rd}$ Edition, D. R. Lide, Ed., CRC Press, Boca Raton, Fla. or the Handbook of Polycyclic Aromatic Hydrocarbons (1985) A. Bjorseth, ed., Merkel Dekker, New York, N.Y. Partially oxygenated species included with PAHs often contain carbonyl groups and are therefore soluble in polar solvents such as alcohols, aldehydes, and ketones.

Initial screening tests showed several promising solvents for performing selective extraction of PAHs from combustion carbon nanomaterials and soot, including ethyl alcohol (ethanol), acetone, and diethyl ether. All of these show little solubility for carbon nanomaterials. Further testing of these three solvents showed the ethanol and diethyl ether performed the best at extracting the PAHs. Ethanol was subsequently chosen for further development because of its very low carbon nanomaterial solubility, low cost, and less hazardous nature.

As used herein the verb "extracting" refers to using a solvent to remove one or more components from a mixture by contacting the mixture with the solvent. Extraction can be a single or multi-step process. Extractions most generally can be liquid-liquid extractions or solid-liquid extractions. In the present invention, solid-liquid extractions are typically used. In a liquid-liquid extraction a mixture in liquid form, e.g., a mixture of solutes in a solvent, is extracted with a liquid solvent. A solution of solutes is extracted with a second solvent typically to separate one or more of the solutes by extraction into that second solvent. In this case, the solvent used to dissolve the solutes is generally not soluble in the second solvent. In solid-liquid extraction, a solid material having a mixture of components, which may be a dried extract from which solvent has been removed, is contacted with a solvent to remove or separate one or more mixture components from the other components. In selective extraction, selected components are removed from the mixture. As used herein "washing" is a form of extraction in which the mixture has brief exposure to the solvent, typically to minimize undesired solubilization of a component.

As used herein, the noun "extract" refers to a substance obtained by using a solvent to remove one or more components from a mixture. The extracts formed in the present invention (e.g. combustion soot extract) are typically concentrated to substantially remove the solvent prior to further extraction. Suitable methods for concentrating solutions are known to those skilled in the art. However, it is preferred to use temperatures and pressures which will not cause substantial sublimation of the carbon nanomaterial(s) of interest.

As used herein, the term "purification" refers to the removal of impurities from a substance. As used herein the term "continuous purification" or "continuous extraction" generally refers to a process or method wherein impurities are removed from a sample without the intervention of additional process steps. An example of a continuous purification technique is Soxhlet extraction. The carbon nanomaterials, including fullerenes, treated by the method of the present invention to remove undesired impurities are typically mixtures of components. As used herein the term "purification" does not typically refer to the generation of a single component product.

In one embodiment, PAHs can be removed from the sample with a single extraction step. In a preferred embodiment, multiple or continuous extraction is used to remove the PAHs from the sample. In a particular method of this embodiment, the sample containing carbon nanomaterials, particularly fullerenes, and PAHs is repeatedly washed or extracted with fresh solvent, thus allowing the maximum amount of PAHs to be dissolved per wash, and preventing saturation of the solvent from limiting the extraction process. Many types of multiple and continuous extraction processes may be adapted for carbon nanomaterial purification. For example, multiple extractions are conveniently achieved using a Soxhlet type extractor in which solvent is continuously distilled and then allowed to wash over the sample. The Soxhlet extraction is continued until PAHs are no longer observed to extract into the solvent. Any known method for estimating or determining the quantity of impurity removed can be used to follow the extraction. For example, the color of the solvent can be visually inspected. Alternatively, the quantity of impurity extracted into a solvent can be assessed by instrumental techniques, including for example, electronic absorption spectroscopy, HPLC methods, mass spectroscopy or the like. Other types of continuous extractions can be used in the invention, e.g., the sample containing carbon nanomaterials and PAHs can be continuously washed on a suitable filter or can be continuously washed after being bound to a chromatographic support. Extractions are often conducted at ambient temperatures for convenience, but can be conducted at temperatures higher or lower than ambient if desired or beneficial.

Depending on the level of purity needed, the extraction process can be modified to increase the amount of PAHs removed. One method for doing this is to extract with solvents or solvent mixtures that have a higher solubility for the PAHs. Some compromise may be necessary since the solubility for carbon nanomaterials may also increase, resulting in the loss of some carbon nanomaterials during the extraction. The amount of carbon nanomaterials removed can be minimized by performing sequential extractions with multiple solvents. For example, the process can be started with ethanol to remove the lighter PAHs and this could be followed by extraction with diethyl ether to remove heavier PAHs. This type of selective extraction can be repeated multiple times with solvents selective for different contaminants. If the extraction process uses distillation to recycle the solvent (such as in the Soxhlet extractor) then constant boiling azeotropic solvent mixtures can also be employed. A final quick wash or extraction with a stronger carbon nanomaterial solvent such as hexane can be used. This last step helps by dissolving the outer layer of the carbon nanomaterial crystals and any PAHs that remain adsorbed on this layer.

The invention also provides a process for efficiently separating solvent extractable fullerenes from samples containing fullerenes and PAHs such as combustion soot. In the process, the sample is extracted with a solvent in which both fullerenes and PAHs are substantially soluble and the sample extract then undergoes selective extraction to remove PAHs. Reduction of the amount of material undergoing selective PAH extraction can result in increased process efficiency.

In one embodiment of the separation process, the invention provides a process for enhancing the fullerene purity of a sample containing fullerenes and PAHs comprising the steps of:

(a) extracting the sample containing fullerenes and PAHs with a first solvent in which fullerenes and PAHs are substantially soluble, thereby creating a first sample extract containing fullerenes and PAHs; and (b) extracting the first sample extract with a second solvent in which the PAHs are substantially soluble but in which the fullerenes are not substantially soluble, thereby creating a second sample extract having enhanced fullerene purity relative to the sample.

As used herein, the term "purity" refers to the extent of being pure, where a pure material contains no detectable undesired component (i.e., impurity). In the present invention, pure materials or purified materials, such as purified carbon nanomaterials, typically contain a mixture of components, e.g., a mixture of different carbon nanomaterials, from which some or most preferably all detectable undesired impurities are removed. In the present invention, it is particularly desired to remove PAHs from carbon nanomaterials. Enhancing the carbon nanomaterial or fullerene purity of a sample refers to removing impurities from the carbon nanomaterials or fullerenes present in the samples, PAH impurities in particular. Enhancing the carbon nanomaterial purity of a sample can also involve separating carbon nanomaterials from the sample to create an extract with either a higher total carbon nanomaterial concentration or a higher concentration of certain carbon nanomaterials than the sample. Typical raw (non-extracted) combustion soot contains 100–1000 ppm of PAHs. The methods of the invention can decrease the PAH concentration of such combustion soot by a hundred-fold or more.

Preferred organic solvents that solubilize fullerenes and PAHs include o-xylene, toluene, and o-dichlorobenzene. As discussed above, preferred organic solvents in which PAHs are substantially soluble and fullerenes are not substantially soluble include ethanol, acetone, and diethyl ether. A highly preferred second solvent in the above process is ethanol. In a preferred embodiment, multiple or continuous extraction with the second solvent is used to remove the PAHs from the first sample extract. In another embodiment, the second sample extract can be extracted with a third solvent selected from the group consisting of ethanol, acetone, and diethyl ether. In a preferred embodiment, the second solvent is ethanol and the third solvent is diethyl ether.

Figure 5:
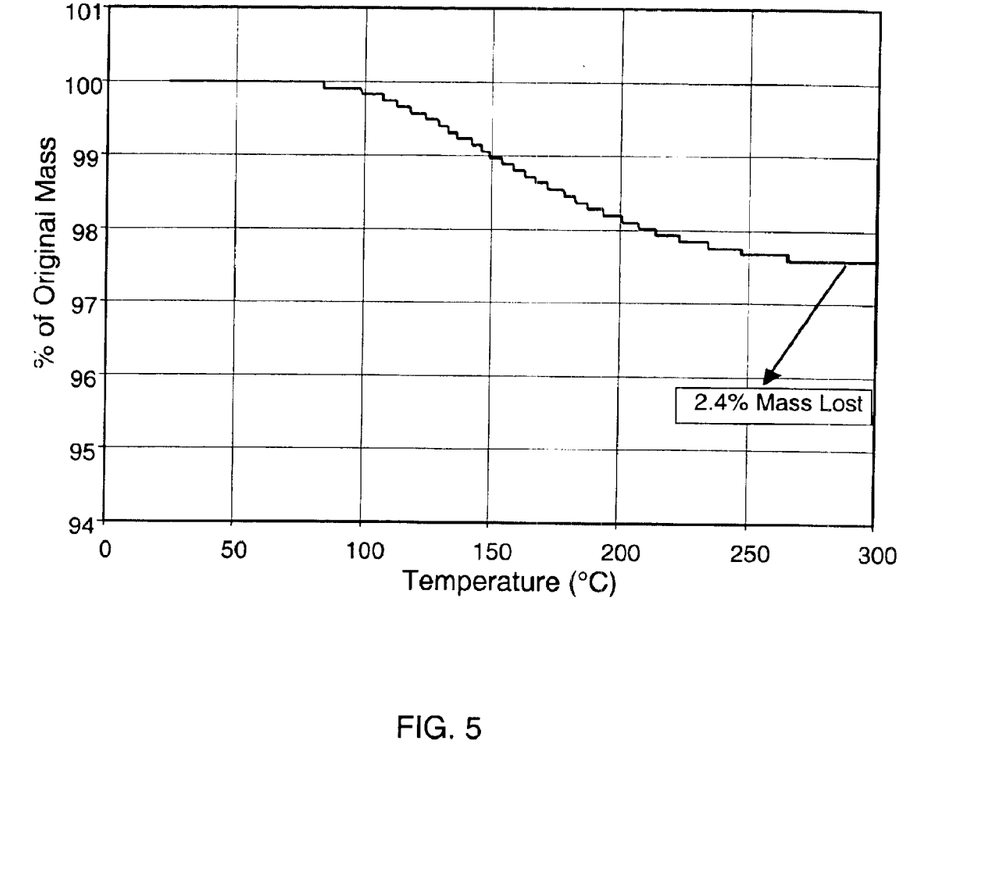
FIG. 5 is a graph showing thermal gravimetric analysis of washed fullerenes showing additional removal of PAHs by vacuum sublimation.

Extraction solvents can be removed by vacuum drying at temperatures less than about 400° C., more preferably between about 40° C. and 400° C. Vacuum drying can also remove any remaining PAHs. Fullerenes are relatively non-volatile and can be heated in vacuum to approximately 400° C. before appreciable sublimation occurs. Most PAHs, (up to four or more rings) will sublime under vacuum at temperatures much lower than this. For example, the boiling point of pyrene is 260° C. at 60 torr. It is preferred that the vacuum is less than 100 millitorr. It is more preferred that the vacuum is less than 50 millitorr. It is yet more preferred that the vacuum is less than 10 millitorr. The level of vacuum that can be achieved will typically vary as a function of drying time. A Roots type blower is used to economically achieve this level of vacuum. The selection of vacuum ovens is within the skill of an ordinary artisan. Vacuum heat treatment can also be used to remove PAHs from the sample prior to contacting it with the solvent. A thermogravimetic analysis of a PAH purified extract showed that high temperature vacuum baking can remove about an additional 3% from the fullerenes, as shown in FIG. 5.

The purification steps described herein can be employed in a different order to suit a particular purification goal. For example, combustion soot can be vacuum-dried first, extracted with a solvent in which fullerenes are not substantially soluble and PAHs are substantially soluble, and followed by treatment with a solvent in which fullerenes are substantially soluble. Other such schemes are encompassed by the invention.

The processes of the invention can employ combustion soot samples ranging from sub-milligram to kilogram and higher quantities. The processes of the invention are particularly suitable for samples of combustion soot weighing at least 100 grams. It is preferred that the processes of the invention utilize samples of combustion soot that are greater than 1000 grams. The processes of the invention are particularly suitable for purifying samples containing fullerenes wherein the sample has at least 1 gram of fullerenes, preferably more than 10 grams of fullerenes, and more preferably more than 100 grams of fullerene.

The purification method of this invention can be applied generally to any method employed for synthesis of carbon nanomaterials, particularly fullerenes, and fullerenic soot to provide products of improved purity. In particular, the method can be employed with fullerenes and fullerenic soot generated by combustion processes such as those described in U.S. application Ser. No. 10/098,829. Further, this purification method can be employed in combination with any method employed for collection of fullerenes and fullerenic soot particularly methods described in U.S. application Ser. No. 10/098,828. Finally, this method of purification is particularly useful in synthetic methods, such as those described in U.S. application Ser. No. 10/099,095, which may generate high levels of PAHs in fullerenes or fullerenic soot.

EXAMPLES

Example 1

Analysis of Combustion Soot

Figure 1A:
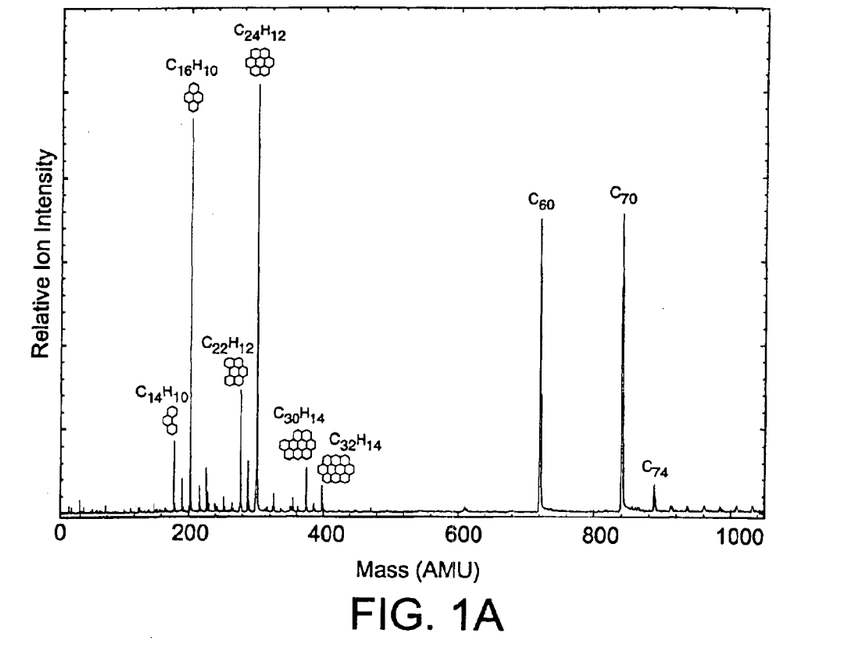
FIG. 1A illustrates mass spectral analysis of the fullerenes and PAHs present in combustion soot for the approximate mass range 0–1040 amu.
Figure 1B:
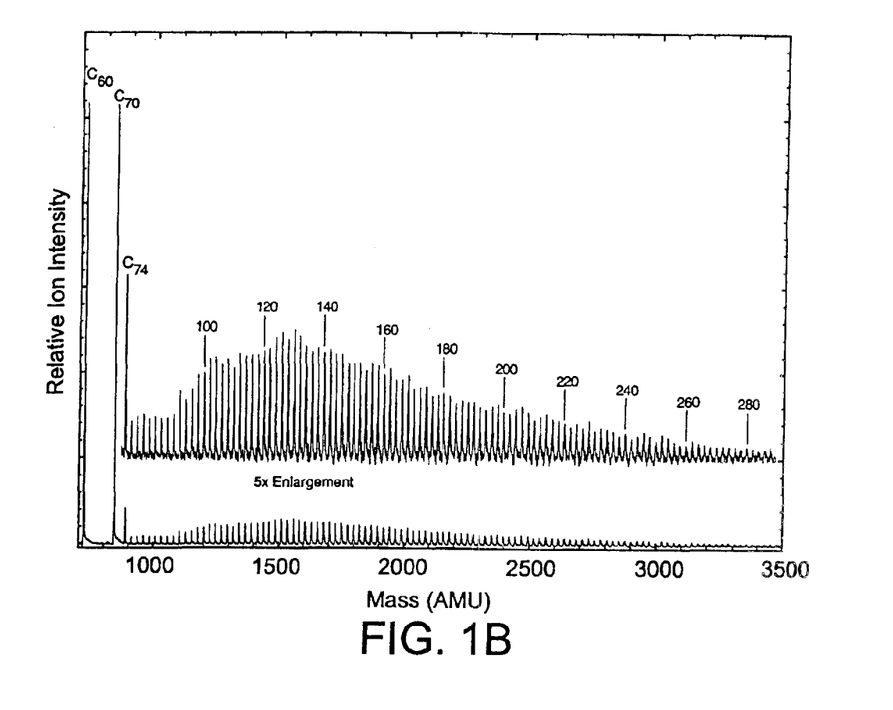
FIG. 1B illustrates mass spectral analysis of the fullerenes and PAHs present in combustion soot for the approximate mass range 970–3500 amu.
Figure 2:
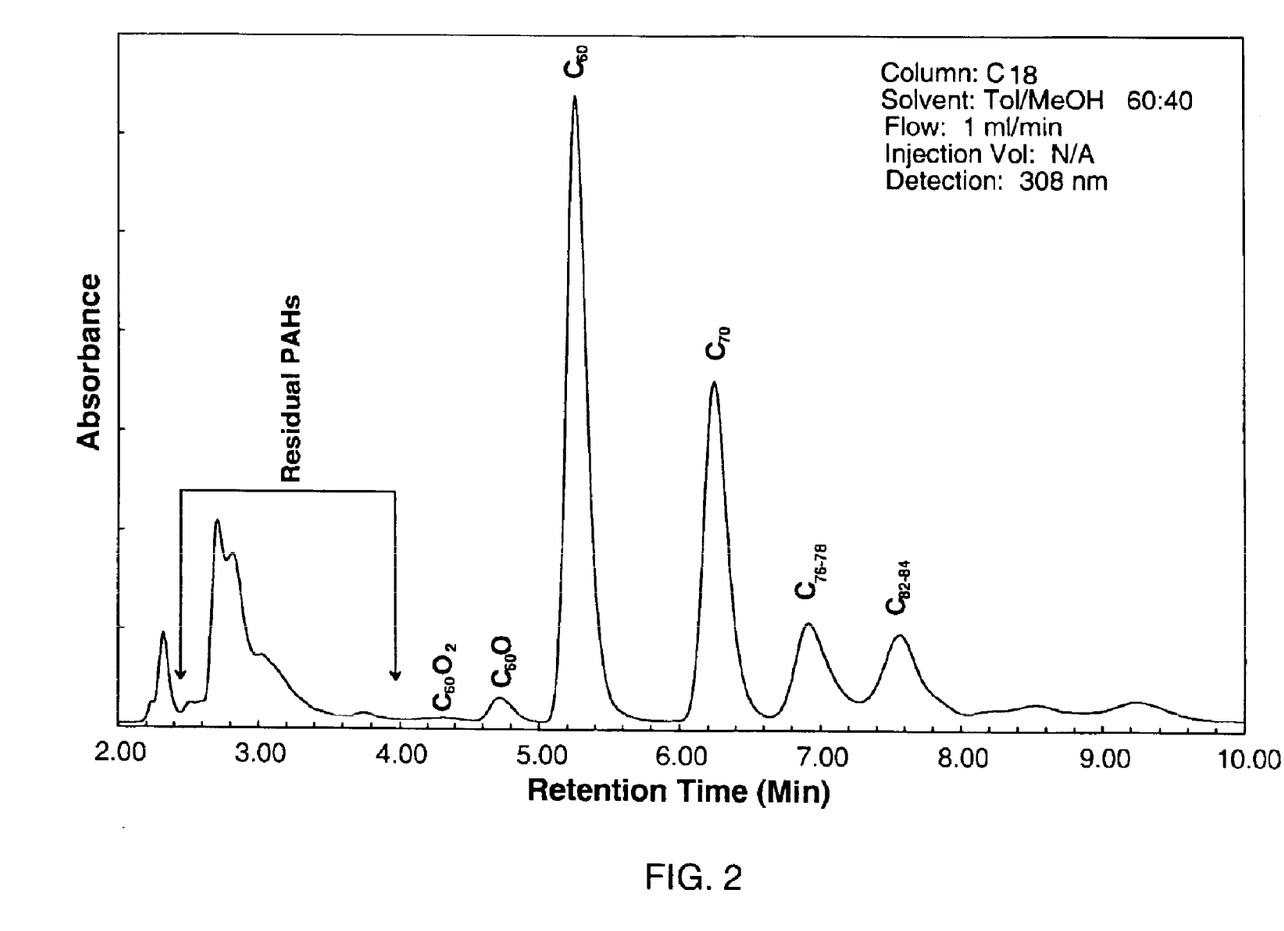
FIG. 2 illustrates chromatographic analysis of PAHs and fullerenes from combustion soot using high performance liquid chromatography (HPLC).

The combustion of fuel and oxygen in a high temperature burner produces a broad range of combustion products. These include unburnt fuel, small hydrocarbons from thermolysis of the fuel, partially oxidized fuel and hydrocarbons, PAHs, partially oxidized PAHs, and carbon nanomaterials, including fullerenes, (and many other species) whose relative amounts can fluctuate widely as the combustion conditions are varied. The most abundant and undesirable class of impurities is the PAHs and their partial oxidation products. FIGS. 1A and 1B show a mass spectral analysis of the fullerenes and PAHs present in combustion soot (where the fuel employed was toluene). The ratio of the two components varies depending on the flame conditions, but typically the PAH to fullerene ratio is about one to twenty as determined by gravimetric and calibrated chromatographic analysis. A high performance liquid chromatographic (HPLC) analysis of PAHs and fullerenes extracted from combustion soot is shown in FIG. 2. Note that the PAHs elute from the column earlier than the fullerenes. A standardized PAH calibration mixture (for EPA method 625) was run to show that species eluting in this range are PAHs, but individual PAHs species were not identified.

Example 2

Purification of Fullerenes from Combustion Soot

Combustion soot was extracted with o-xylene to remove fullerenes and PAHs from the non-soluble soot. The solution containing the fullerenes was then concentrated to dryness and the fullerene/PAH mixture was transferred to a large Soxhlet extractor where it was extracted with ethanol until no significant further extraction of PAHs into the ethanol in the Soxhlet cup was visually detectible (approximately 150 cycles). The fullerenes were then removed from the extraction thimble and washed once with diethyl ether followed by hexane. The fullerenes were then transferred to a vacuum oven where they were spread uniformly on a shallow tray for drying. The vacuum oven was pumped to an ultimate vacuum less than 10 mtorr. The vacuum oven was slowly heated over 12 hours from room temperature to 300° C. to further remove any remaining solvent, PAHs, and hydrocarbon impurities.

Example 3

Analysis of Purification Process

Figure 3A:
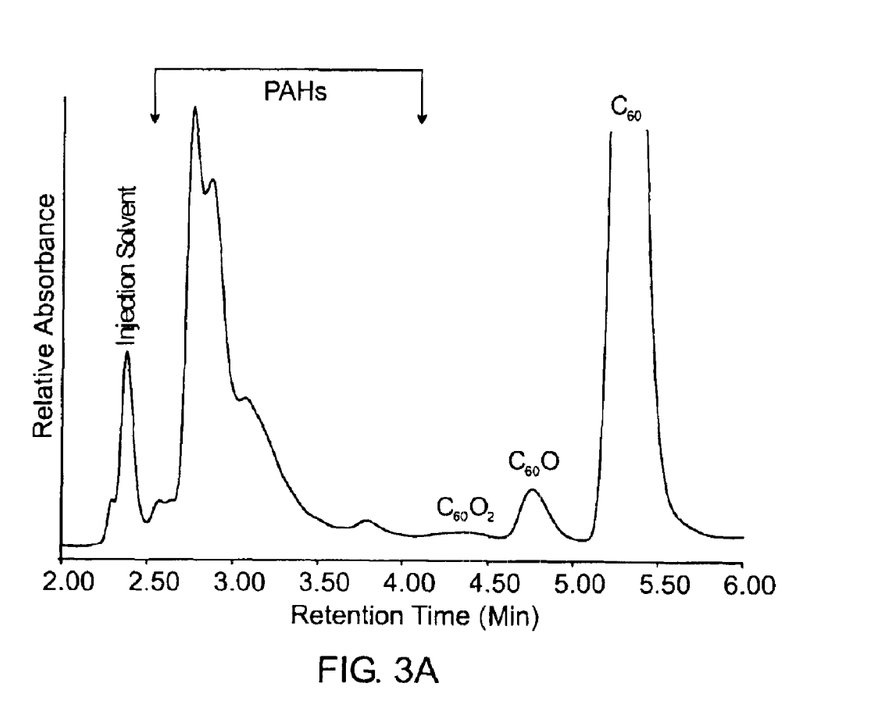
FIG. 3A illustrates HPLC analysis of combustion fullerene extract before extraction to remove PAHs.
Figure 3B:
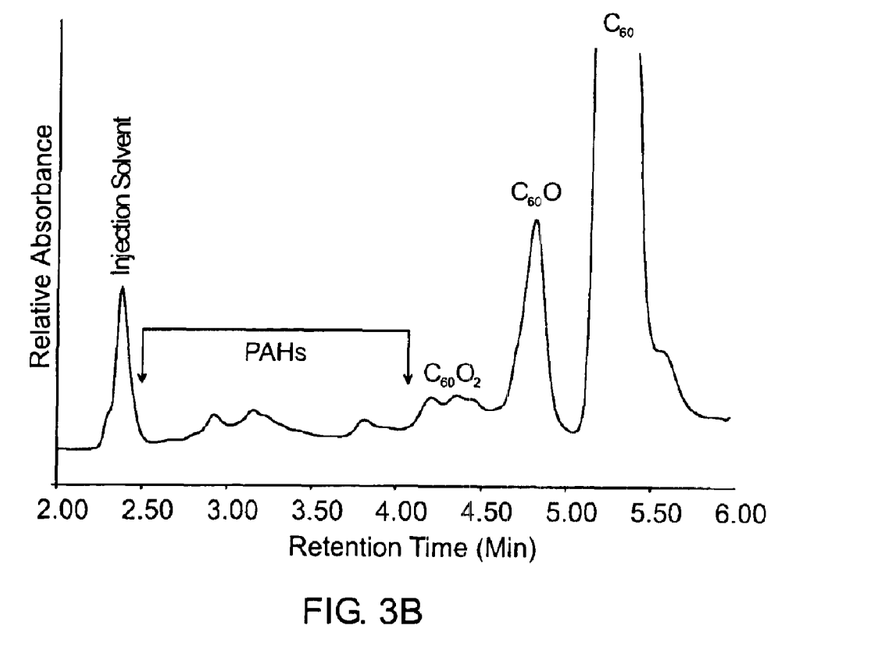
FIG. 3B illustrates HPLC analysis of combustion fullerene extract after sohxlet extraction with ethanol followed by washing with diethyl ether.
Figure 4:
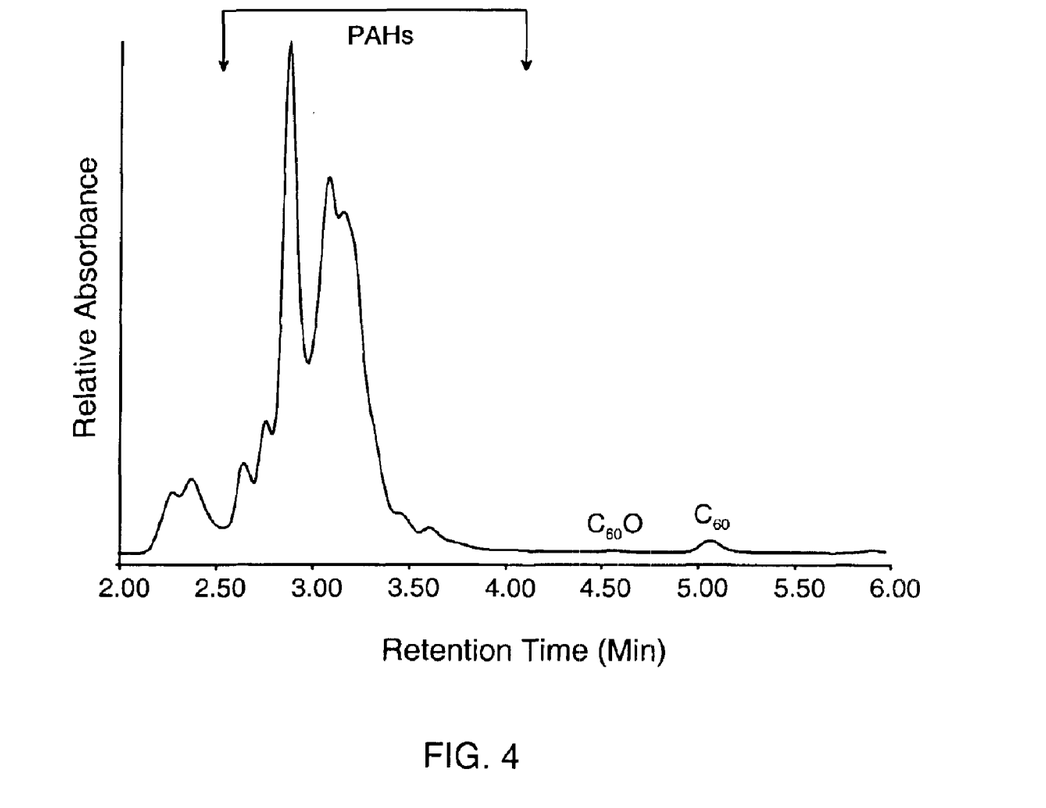
FIG. 4 illustrates HPLC analysis of the ethanol extract after washing the fullerenes.

The effectiveness of the extraction procedure described in Example 2 is illustrated in FIGS. 3A and 3B. FIG. 3A shows an enlargement of the PAH region of the HPLC analysis for typical combustion fullerene extract produced by extracting the raw combustion soot with o-xylene. FIG. 3B shows that the PAHs are effectively removed by the extraction treatment.

Those of ordinary skill in the art will appreciate that the processing conditions and techniques, including purification processes, other than those that are specifically illustrated herein can be employed in the practice of this invention as claimed without resort to undue experimentation. Those of ordinary skill in the art will recognize and understand that functional equivalents of the procedures, processing conditions, and techniques illustrated herein exist in the art. All such known equivalents are intended to be encompassed by this invention.

All references cited herein are incorporated by reference herein to the extent that they are not inconsistent with the descriptions herein.

We claim:

1. A process for removal of polycyclic aromatic hydrocarbons (PAHs) from a sample containing fullerenes and PAHs comprising the steps of:
    (a) providing a sample containing fullerenes and PAHs and a first solvent in which the fullerenes are not substantially soluble and in which the PAHs are substantially soluble;
    (b) continuously or multiply extracting the sample with the first solvent; and
    (c) extracting the sample extract of step (b) with a second different solvent in which the fullerenes are not substantially soluble and in which the PAHs are substantially soluble
wherein the first and second solvents are selected from the group consisting of alkanes, ethers, alcohols, ketones, and aldehydes having fewer than eight carbon atoms, optionally substituted with one or more substitutents selected from the group consisting of ether groups, alcohol groups, ketone groups, aldehyde groups, halide groups, nitro groups, and nitrile groups, mixtures and azeotropes thereof, and supercritical or near supercritical fluids.

2. The process of claim 1 wherein the first or second solvent is ethanol.

3. The process of claim 1 wherein the sample is combustion soot.

4. The process of claim 1 wherein the sample is a combustion soot extract.

5. The process of claim 1 wherein the sample contains at least 10 grams of fullerenes.

6. The process of claim 1 wherein the sample contains at least 100 grams of fullerenes.

7. A process for the removal of PAHs from a sample containing carbon nanomaterials and PAHs comprising the steps of:
    (a) providing a sample containing carbon nanomaterials and PAHs and a first solvent in which the carbon nanomaterials are not substantially soluble and in which the PAHs are substantially soluble;

(b) continuously or multiply extracting the sample with the first solvent, thereby creating a first sample extract;

(c) providing a second solvent, different from said first solvent, in which the carbon nanomaterials are not substantially soluble and in which the PAHs are substantially soluble; and (d) extracting the first sample extract with the second solvent.

8. The process of claim 7 wherein the carbon nanomaterials include fullerenes.

9. The process of claim 7 wherein the solvents used for the extraction steps are selected from the group consisting of alkanes, ethers, alcohols, ketones, and aldehydes having fewer than eight carbon atoms, optionally substituted with one or more substitutents selected from the group consisting of ether groups, alcohol groups, ketone groups, aldehyde groups, halide groups, nitro groups, and nitrile groups, mixtures and azeotropes thereof, and supercritical or near supercritical fluids.

10. The process of claim 7, comprising at least one additional extraction step utilizing a solvent in which the carbon nanomaterials are not substantially soluble, which is different from the solvent utilized in the previous extraction step until a desired level of purity from PAHs is obtained.

11. A process for the removal of PAHs from a sample containing carbon fullerenes and PAHs comprising the steps of:

(a) providing a sample containing fullerenes and PAHs and a first solvent in which the carbon fullerenes are not substantially soluble and in which the PAHs are substantially soluble;

(b) continuously or multiply extracting the sample with the first solvent, thereby creating a first sample extract;

(c) providing a second solvent, different from said first solvent, in which the carbon fullerenes are not substantially soluble and in which the PAHs are substantially soluble; and (d) extracting the first sample extract with the second solvent.

12. A process for enhancing the fullerene purity of a sample containing fullerenes and PAHs comprising the steps of:

(a) extracting the sample containing fullerenes and PAHs with a first solvent in which fullerenes and PAHs are substantially soluble, thereby creating a first sample extract containing fullerenes and PAHs; and (b) extracting the first sample extract with a second solvent in which the PAHs are substantially soluble but in which the fullerenes are not substantially soluble, thereby creating a second sample extract having enhanced fullerene purity relative to the sample.

13. The process of claim 12 wherein the solvents used for the extraction steps are selected from the group consisting of alkanes, ethers, alcohols, ketones, and aldehydes having fewer than eight carbon atoms, optionally substituted with one or more substitutents selected from the group consisting of ether groups, alcohol groups, ketone groups, aldehyde groups, halide groups, nitro groups, and nitrile groups, mixtures and azeotropes thereof, and supercritical or near supercritical fluids.

14. The process of claim 12 wherein the first sample extract is continuously or multiply extracted with the second solvent.

15. The process of claim 12 wherein the first solvent is selected from the group consisting of single ring aromatic compounds or mixtures thereof.

16. The process of claim 12 wherein the first solvent is selected from the group consisting of o-xylene, toluene, and o-dichlorobenzene.

17. The process of claim 12 wherein the first solvent is o-xylene.

18. The process of claim 12 wherein the second solvent is selected from the group consisting of acetone, ethanol, and diethyl ether.

19. The process of claim 12 wherein the second solvent is ethanol.

20. The process of claim 12 wherein the second solvent is supercritical or near supercritical carbon dioxide.

21. The process of claim 12 wherein the sample containing fullerenes and PAHs is combustion soot.

22. The process of claim 12 wherein the sample is combustion soot produced from the burning of aromatic hydrocarbon fuel.

23. The process of claim 12 wherein the sample is combustion soot produced from the burning of aromatic hydrocarbon fuel comprising one or more aromatic components that have two or more rings, one or more of which can be an aromatic ring or a heterocyclic ring.

24. The process of claim 12 wherein the sample is combustion soot produced from the burning of aromatic hydrocarbon fuel having at least 30% by weight of one or more aromatic components having two or more six-member, five-member rings or both.

25. The process of claim 12 wherein said sample containing fullerenes is at least 1 gram.

26. The process of claim 12 wherein said sample containing fullerenes is at least 10 grams.

27. The process of claim 12 wherein said sample containing fullerenes is at least 1000 grams.

28. The process of claim 12 wherein said sample containing fullerenes has at least 100 milligrams of fullerenes.

29. The process of claim 12 wherein said sample containing fullerenes has at least 1 gram of fullerenes.

30. The process of claim 12 wherein said sample containing fullerenes has at least 100 grams of fullerenes.

31. The process of claim 12 further comprising the step of extracting the second sample extract with a third solvent in which the PAHs are substantially soluble but in which the fullerenes are not substantially soluble, thereby creating a third sample extract having enhanced fullerene purity relative to the sample.

32. The process of claim 12 further comprising vacuum drying the fullerene sample at a temperature less than about 400 C.

33. A process for the purification of fullerenes from combustion soot containing fullerenes and PAHs comprising the steps of:

(a) extracting the combustion soot with a first solvent to remove fullerenes and PAHs; and (b) continuously or multiply extracting the fullerenes and PAHs removed in step (a) with a second solvent to remove PAHs.

34. A process for enhancing the carbon nanomaterial purity of a sample containing carbon nanomaterials and PAHs comprising the steps of:

(a) extracting the sample containing carbon nanomaterials and PAHs with a first solvent in which carbon nanomaterials and PAHs are substantially soluble, thereby creating a first sample extract containing carbon nanomaterials and PAHs; and (b) extracting the first sample extract with a second solvent in which the PAHs are substantially soluble but in which the carbon nanomaterials are not substantially soluble, thereby creating a second sample extract having enhanced carbon nanomaterial purity relative to the sample.

35. The process of claim 34 wherein the solvents used for the extraction steps are selected from the group consisting of alkanes, ethers, alcohols, ketones, and aldehydes having fewer than eight carbon atoms, optionally substituted with one or more substituents selected from the group consisting of ether groups, alcohol groups, ketone groups, aldehyde groups, halide groups, nitro groups, and nitrile groups, mixtures and azeotropes thereof, and supercritical or near supercritical fluids.

36. The process of claim 34 wherein the first sample extract is continuously or multiply extracted with the second solvent.

37. The process of claim 34 wherein the first solvent is selected from the group consisting of single ring aromatic compounds or mixtures thereof.

38. The process of claim 34 wherein the first solvent is selected from the group consisting of o-xylene, toluene, and o-dichlorobenzene.

39. The process of claim 34 wherein the first solvent is o-xylene.

40. The process of claim 34 wherein the second solvent is selected from the group consisting of acetone, ethanol and diethyl ether.

41. The process of claim 34 wherein the second solvent is ethanol.

42. The process of claim 34 wherein the second solvent is supercritical or near supercritical carbon dioxide.

43. The process of claim 34 wherein the sample containing carbon nanomaterials and PAHs is combustion soot.

44. The process of claim 34 wherein the sample is combustion soot produced from the burning of aromatic hydrocarbon fuel.

* * * * *